UNITED STATES PATENT OFFICE.

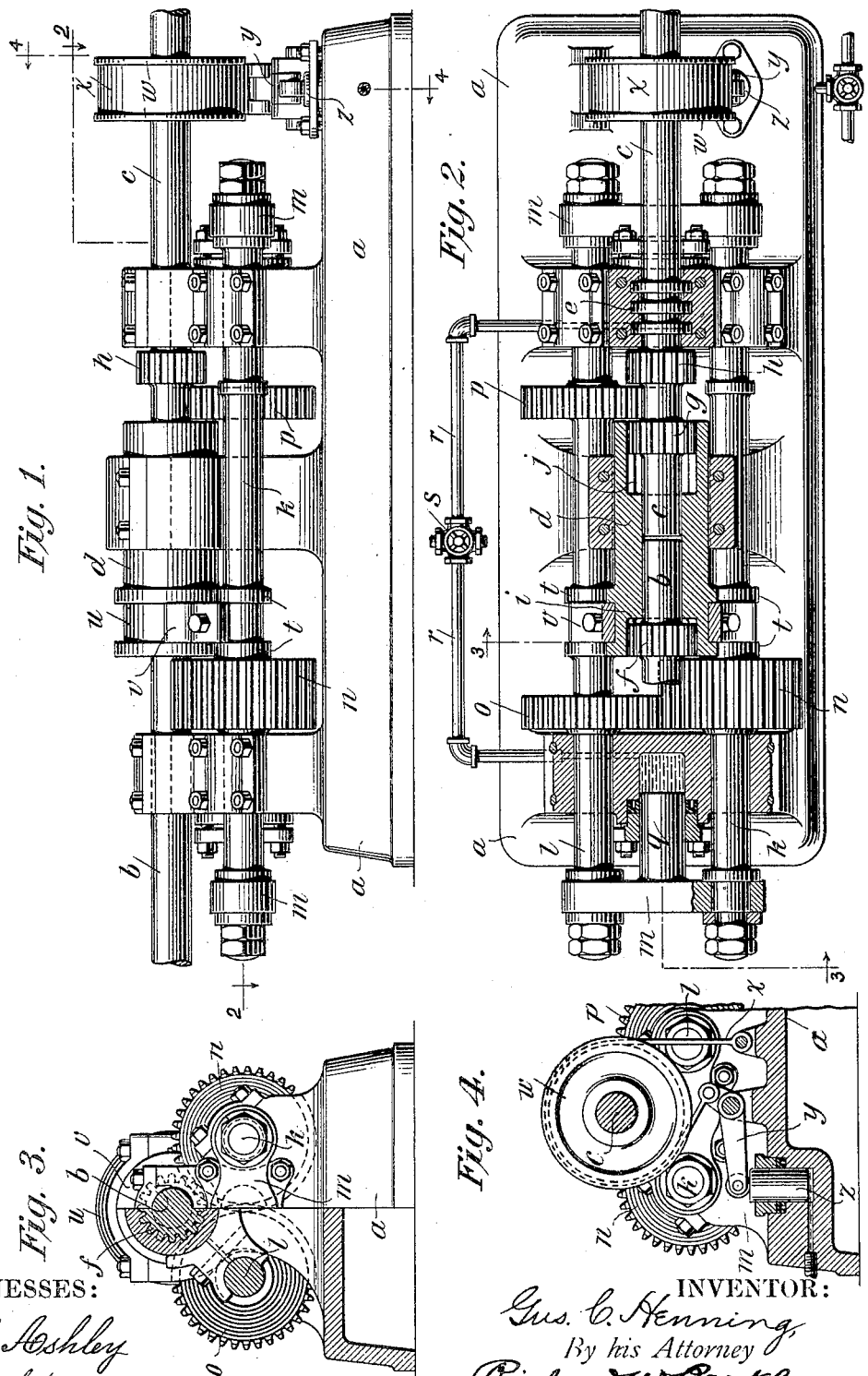

GUSTAVUS C. HENNING, OF NEW YORK, N. Y.

REVERSING MECHANISM.

SPECIFICATION forming part of Letters Patent No. 689,879, dated December 31, 1901.

Application filed February 26, 1901. Serial No. 48,876. (No model.)

*To all whom it may concern:*

Be it known that I, GUSTAVUS C. HENNING, a citizen of the United States, and a resident of New York city, in the county of New York and State of New York, have invented a certain new and useful Improvement in Reversing Mechanism, of which the following is a specification.

The present invention relates to reversing-gearing for reaction or turbine engines, the object of the invention being to reverse the direction of rotation of a shaft which is driven from a progressively-rotating member or shaft of said engine.
The invention consists of features of construction and combinations of devices hereinafter described and more particularly pointed out in the appended claims.

In its general organization the invention includes two shafts, an endwise-movable rotatory member geared to said shafts when one shaft is to drive the other in one direction and disconnected from at least one shaft when the driven shaft is to rotate in the reverse direction, connected gears shiftable endwise into and out of mesh with gears on said shafts as said member is moved to disconnect and connect said shafts, the whole being arranged to drive the second shaft in reverse directions from the first shaft, whose direction of motion remains unchanged, or said connected gears may be shiftable otherwise than endwise. In the preferred form of the invention the two shafts are alined with each other and have gears fast thereon, and the endwise-movable member is in the form of a rotatory sleeve having the adjacent ends of said shafts journaled therein and is provided with internal gears for coaction with gears on said shafts to couple the shafts together directly, while the endwise-shiftable connected gears are mounted on shafting which is parallel with the alined shafts and is moved endwise to carry said connected gears into and out of mesh with gears on said alined shafts whenever one of the internal gears on said sleeve is disengaged from and reëngaged with a gear on one of said alined shafts, the sleeve being connected to and moving with said shafting simultaneously.
The preferred form of the invention is illustrated in the accompanying drawings, forming part of this specification, in which—

Figure 1 is a side elevation. Fig. 2 is a plan, partly in section, the view being taken on the planes indicated in Fig. 1 by the line 2 2. Fig. 3 is an end view, partly in section, on the planes indicated in Fig. 2 by the line 3 3; and Fig. 4 is a view from the right in Fig. 1, the view being partly in section on the plane indicated by line 4 4.

The same reference character will be used to designate the same part in all the figures of the drawings.

The reference character $a$ indicates a suitable bed and framing, and $b\ c$ two alined shafts journaled in frame $a$ and in a sleeve $d$, which is also journaled in frame $a$. Either of the shafts $b\ c$ may be the driver and the other the driven shaft, a reaction or turbine engine preferably being employed to drive the progressively-rotating driver-shaft. (Engine not shown.) The shaft $b$ is shown as the driver-shaft and shaft $c$ as the driven shaft, there being a thrust-bearing $e$ for the shaft $c$, whereby that shaft is adapted to act as a propeller-shaft in a boat or other vessel.

$f$ designates a gear (sometimes having the function of a ribbed and grooved male clutch member) which is fast on the shaft $b$; $g$, a ribbed and grooved male clutch member fast on the shaft $c$; $h$, a spur-gear fast on said shaft $c$; $i\ j$, ribbed and grooved female clutch members formed on or attached to the sleeve $d$ and adapted to engage with the male clutch members $f\ g$.

By preference the member $j$ is of a length such that it is never disengaged from the member $g$ whatever be the position of the sleeve $d$, though the member $i$ is disengaged from the gear or member $f$ when the sleeve $d$ has been moved sufficiently far in one direction as to the limit of its motion in said direction. When the members $f\ i$ are in mesh with each other, the shaft $b$ drives the shaft $c$ directly through the sleeve $d$, the members $j\ g$ being in mesh with each other, as will be understood.

$k\ l$ are two parallel shafts mounted in the framework $a$ to have endwise motion and are connected together at their ends by the cross-heads $m$, which are secured in place by shoulders, collars, nuts, and washers. The shaft $l$ has motion of rotation, and the shaft $k$ may also have such motion. The shaft $k$ has a wide-faced gear n mounted thereon to move endwise therewith and free to rotate independently if shaft k does not rotate and fast on the shaft if the latter rotates, and the shaft l has two gear-wheels o p (shown as being equal) fast thereon. The gear o meshes continuously with the gear n, while gear p sometimes is in mesh with the gear h and at other times lies between the parts g h, touching neither, according as the shafts k l are in one or the other of the limits of their endwise motion. When the said shafts k l and sleeve d are at the limit of their endwise motion to the right in Fig. 2, the member i is out of mesh with the gear f, (clutch member,) and the gear n is in mesh with the gear f, and the gear p is in mesh with the gear h, and shaft b drives the shaft c through the train of gears f n o p h and shaft l in a direction the reverse of that in which it drives the shaft c when the parts are in the positions thereof shown in the drawings.

Suitable means are provided for moving the frame composed of the shafts k l and heads m to and fro—as, for example, hydraulic rams q, connected with said heads m. (The ram at the right in Fig. 2 is indicated, but is not marked.) Suitable pipes r are connected with the chambers for said rams q, and the pressure behind the rams is controlled by a suitable cock at s, which releases the pressure behind one ram as it turns it on behind the other.

By preference the sleeve d is connected to the shafts k l, to be moved endwise simultaneously therewith, as by means of the collars t on said shafts and a block v, which fits into a circumferential groove u in the sleeve d and which has jaws fitting against the shafts k l and between the collars t thereon, as shown. The block v is made in parts which are bolted together.

The driven shaft may have a brake device connected therewith, as a brake-wheel w, fast on the shaft c, a strap x, surrounding the wheel w and having one end fast to the frame a, and a lever y, fulcrumed between its ends and connected at one end to the strap x and having its other end resting on a hydraulic ram z by means of an antifriction-roller. The ram raises the lever and applies the brake, as will be understood. The pressure behind the ram is controlled in any suitable way. The brake serves to hold the driven shaft steady during the shifting of the sleeve d and other parts and is especially useful when the shaft c carries a propeller or so.

While the shaft b has been described as the progressively-revolving driver-shaft and the shaft c as the reversely-driven shaft, it is obvious that this arrangement may be reversed without necessitating any change whatever in the arrangement of the parts or in the mode of operation, except change of location of the brake device when that device is used or required.

The operation is as follows: When the parts are in the positions shown in Figs. 1 and 2, the shaft b drives the shaft c directly through the sleeve d in the same direction as it itself moves, the clutches f i and g j being in mesh and gears f n and h p being out of mesh. By sliding the shafts k l and the sleeve d to the right in Figs. 1 and 2 to the limit of their motion in that direction the clutch member i is moved out of mesh with gear f and gears n p are moved into mesh with the gears f h, and the motion of rotation of the shaft b is transmitted to the shaft c by way of the gears f n o p h and the shaft l, and the shaft c is driven in the reverse direction at the same speed as or at a rate of speed differing from that of shaft b, according to the proportions of the intervening gears, the proportions shown in the drawings giving equal speeds.

What I claim as new, and desire to secure by Letters Patent of the United States, is—

1. The combination of a progressively-moving driver-shaft, a second shaft which it is desired to drive in either direction, gears on said shafts, an endwise-movable member geared with said shafts and disconnectible by its endwise motion from at least one of said shafts, means for moving said member endwise, and gears moved endwise by said means into and out of mesh with gears on said driver and driven shafts as said member uncouples and couples said driver and driven shafts, substantially as described.

2. The combination of two independent alined shafts, gears thereon, a rotatable endwise-movable sleeve surrounding said shafts and provided with internal teeth or ribs for coaction with ribs or teeth on said shafts, said sleeve when moved in one direction being disconnected from at least one of said shafts, endwise-movable shafting, gears carried thereby for coaction with gears on said alined shafts, and connections between said shafting and said sleeve for causing simultaneous motion thereof, substantially as described.

3. The combination of two independent alined shafts, gears thereon, a rotatable endwise-movable sleeve surrounding said shafts and provided with internal ribs or teeth for coaction with ribs or teeth on said shafts, said sleeve being disconnected from at least one of said shafts when at one limit of its endwise motion, endwise-movable parallel-geared shafts connected to and moving endwise simultaneously with said sleeve, and gears on said parallel shafts for coaction with gears on said alined shafts, the arrangement being such that the said parallel shafts are geared with the driver and driven shafts when the sleeve is not coupled with both of them, substantially as described.

4. The combination of a progressively-moving driver-shaft, a second shaft which it is desired to drive in either direction, said shafts being in line with each other, ribbed and grooved clutch members for connecting said shafts whereby the second shaft is driven in one direction, adjustable toothed gearing for connecting said shafts to cause the first to drive the second in the reverse direction, and a brake mechanism for the second shaft, substantially as described.

5. The combination of two independent alined shafts, gears thereon, a rotatable endwise-movable sleeve in which an end of each of said shafts is journaled, internal teeth or ribs rigid with said sleeve for coaction with teeth or ribs on said shafts, said sleeve being disconnected from at least one of said shafts when at one limit of its endwise motion, connected endwise-movable gears for coaction with gears on said shafts, and means for moving said sleeve and said connected gears to and fro axially thereof, substantially as described.

6. The combination of two alined shafts independent of each other, gears thereon, a journaled sleeve movable endwise in its bearings and provided with internal teeth for coaction with gear teeth or ribs on said shafts and said shafts being journaled each at one end in said sleeve, and said sleeve being disconnected by its endwise motion from at least one of said shafts whereby the sleeve and disconnected shaft may rotate independently of each other, endwise-movable shafting provided with gears for coaction with gears on said alined shafts, and connections between said shafting and said sleeve for causing simultaneous motion thereof endwise, substantially as described.

Signed at New York, in the county of New York and State of New York, this 23d day of February, A. D. 1901.

GUS. C. HENNING.

Witnesses:
J. L. KORNICKER,
R. W. BARKLEY.